United States Patent [19]
Sulzbach et al.

[11] Patent Number: 5,547,276
[45] Date of Patent: Aug. 20, 1996

[54] METHOD AND APPARATUS FOR CONTINUOUSLY DISPERSING FINE PARTICLE-SIZED SOLIDS IN A LIQUID

[75] Inventors: Hans-Michael Sulzbach, Königswinter; Reiner Raffel, Siegburg; Ferdinand Althausen, Neunkirchen-Seelscheid; Jürgen Wirth, Cologne, all of Germany

[73] Assignee: Maschinenfabrik Hennecke GmbH, Leverkusen, Germany

[21] Appl. No.: 496,377

[22] Filed: Jun. 29, 1995

[30] Foreign Application Priority Data

Jul. 6, 1994 [DE] Germany .................. 44 23 649.2
Oct. 6, 1994 [DE] Germany .................. 44 35 717.6

[51] Int. Cl.⁶ .................. B01F 13/06; B01F 15/04
[52] U.S. Cl. .................. 366/139; 366/152.1; 366/152.6; 366/156.2
[58] Field of Search .................. 366/132–134, 366/139, 151.1, 152.2, 152.1, 152.6, 153.1, 154.1, 155.1, 156.1, 156.2, 158.4, 168.1, 160.1, 160.2, 160.5, 162.1, 162.2, 177.1, 182.1; 425/203

[56] References Cited

U.S. PATENT DOCUMENTS

| | | | |
|---|---|---|---|
| 2,572,063 | 10/1951 | Skipper | 366/139 X |
| 4,068,831 | 1/1978 | Ebeling et al. | |
| 4,792,424 | 12/1988 | Loman | 425/203 X |
| 5,152,943 | 10/1992 | Sulzbach | |
| 5,240,324 | 8/1993 | Phillips et al. | 366/160.2 X |

FOREIGN PATENT DOCUMENTS

| | | |
|---|---|---|
| 431388 | 6/1991 | European Pat. Off. |
| 3507202 | 9/1986 | Germany |

*Primary Examiner*—Charles E. Cooley
*Attorney, Agent, or Firm*—Joseph C. Gil

[57] ABSTRACT

A method and apparatus for continuously dispersing fine particle-sized solids in liquids by a continuous process, in which a constant stream of liquid is fed into a mixing apparatus and fine-particle-sized solids are metered into the mixing apparatus by means of a metering screw as a function of the pressure prevailing in the mixing apparatus. The solids conveyed by the metering screw are supplied from an intermediate vacuum tank with a controlled filler level.

4 Claims, 1 Drawing Sheet

METHOD AND APPARATUS FOR CONTINUOUSLY DISPERSING FINE PARTICLE-SIZED SOLIDS IN A LIQUID

BACKGROUND OF THE INVENTION

The present invention relates to a method for continuously dispersing fine-particle-sized solids in a liquid, and, in particular, a liquid component of a two-component reactive plastic, such as for example a polycondensation or polyaddition system, and more particularly in the polyol component of a polyurethane system.

In two-component plastic, the two plastic components which are reactive with one another are usually mixed in liquid form in a mixhead in specific quantitative ratios and then reacted, optionally after having been introduced into a mold. Catalysts or heat are optionally used to accelerate the reactions. In the case of polyurethane plastics, such as for example polyurethane foams, one of the components consists of an isocyanate or an isocyanate prepolymer and the other component of a polyol, the two components being metered into the mixhead in a specific ratio.

Inorganic, e.g. mineral fillers, or organic fillers are frequently added to such two-component plastics for the purpose of modifying their property profile. U.S. Pat. No. 5,152,943 (corresponding to German Offenlegungschrift 3,841,671) describes mixing the filler with one of the reactive components of the two-component system in a preliminary mixer and feeding the filler-containing component into the mixhead. The filler is fed into the preliminary mixer by means of a screw in which the filler is compacted, the metering of the filler being effected by controlling the speed of rotation of the screw as a function of the pressure in the preliminary mixer.

European Patent 431,388 describes preventing any undesirable introduction of air into the preliminary mixer in the process according to the '943 patent by designing the jacket of the compacting screw at the outlet end upstream of the preliminary mixer in the form of a porous microfilter consisting of a porous sintered metal or a plastic and surrounding it with an annular suction channel for removing the air from the compacted filler by suction. The disadvantage of this process is that when fine particle-sized fillers are used or fillers with a high content of very fine particles, the microfilter becomes blocked within relatively short periods of time and must be replaced.

The object of the present invention was therefore to prevent the above-mentioned disadvantages. More particularly, the object was to prevent the undesirable air present in the intermediate spaces between the solid particles from entering the preliminary mixer, while maintaining the metering accuracy of the metering screw for the fine particle-sized solids (fillers). This object is achieved by the present invention.

DESCRIPTION OF THE INVENTION

Figure 1:
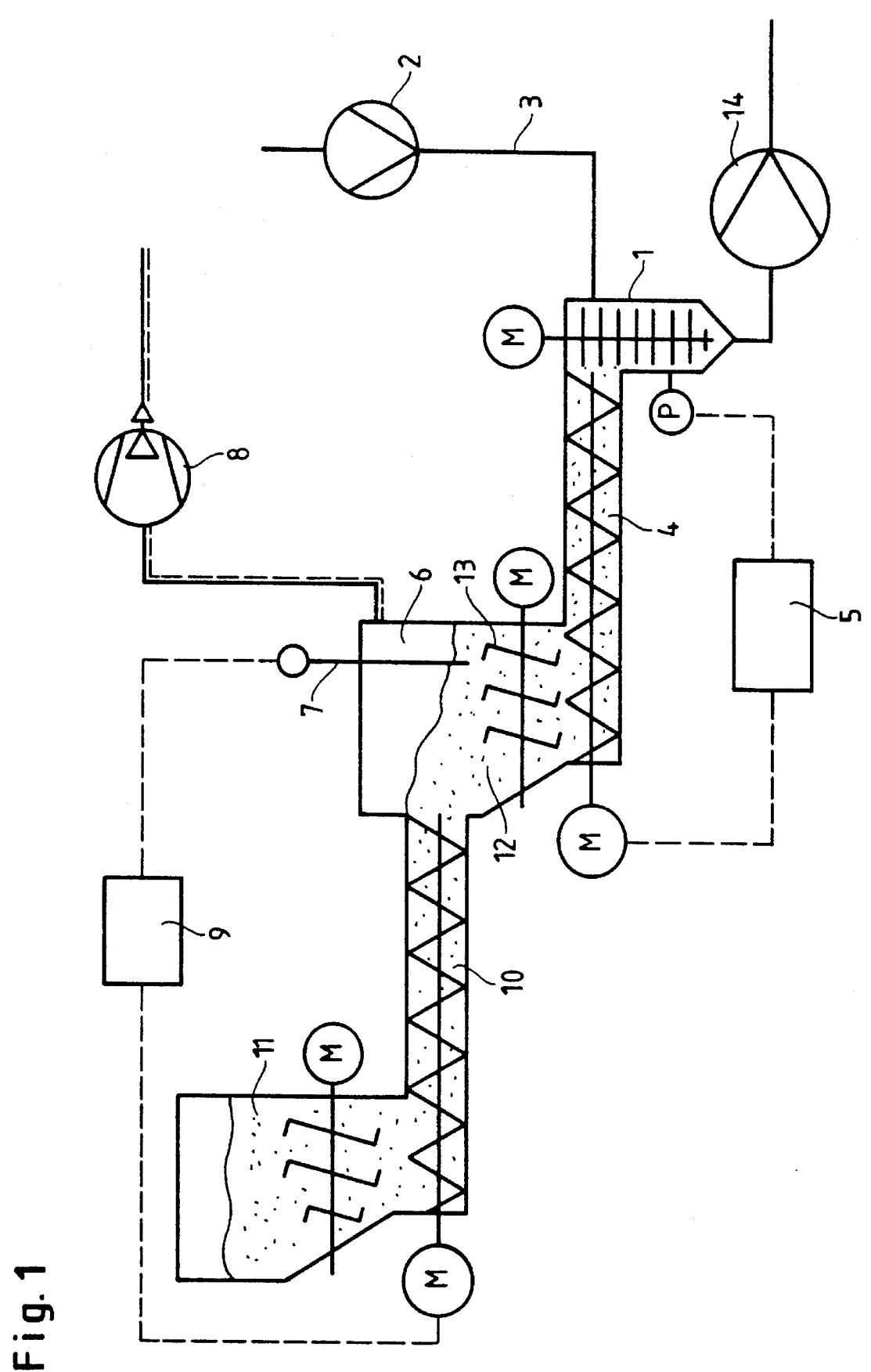
FIG. 1 shows a device according to the present invention.

The present invention is directed to a method for continuously dispersing fine particle-sized solids in a liquid using a mixing apparatus, in which a specific stream of liquid is continuously fed into the mixing apparatus and the fine particle-sized solids are fed continuously into the mixing apparatus by means of a screw in which they are compacted. The metering of the solids is controlled by controlling the conveying speed of the screw as a function of the pressure prevailing in the mixing apparatus and the solids are deaerated before being introduced into the mixing apparatus. An intermediate vacuum tank is arranged upstream of the screw which supplies the solids to the mixing apparatus, and the filler level in the intermediate tank is kept essentially constant. The height of the fine-particle-sized solids in the intermediate tank is preferably at least twice to three times, and at most 7 to 10 times the diameter of the screw which supplies the filler to the mixing apparatus.

According to the invention a filler level probe is provided in the intermediate vacuum tank, by means of which the amount of fine particle-sized solids fed into the intermediate tank is controlled. Preferably the intermediate tank is fed from a storage vessel by means of a feed screw or a rotary feeder. The feed screw or the rotary feeder preferably feeds the solids into the intermediate tank at approximately the same level as the filler level of the tank, in order to prevent the fine particle-sized filler from trickling or forming dust in the intermediate tank. Air is removed by suction from the top of the intermediate tank by means of a vacuum pump, so that reduced pressure prevails in the intermediate tank. The reduced pressure which prevails in the intermediate tank and is controlled by the vacuum pump is such that the quantity of air remaining between the solid particles is tolerable and can for example be completely dissolved in the liquid in the mixing apparatus. The pressure prevailing in the intermediate tank can be from 0.01 to 0.8 bars (absolute), and preferably from 0.1 to 0.3 bars.

The intermediate tank preferably has such dimensions that the resulting residence time of the fine particle-sized solids in the intermediate tank is from 2 to 10 minutes, and preferably from 3 to 5 minutes.

The method according to the invention is particularly suitable for dispersing fine particle-sized solids in liquids which only wet the solids with some difficulty or in high viscosity liquids with viscosities of, for example, from 300 to 3,000 mPa·s, since it is particularly difficult to remove any remaining undesirable gas content after the solid and the liquid have been mixed.

Preferably the binder component of a two-component reactive plastic is used as the liquid, and in particular the polyol component of a polyurethane reactive system. The organic or inorganic fillers customarily used in two-component systems can be used as the solids, such as, for example, ground glass fibers, hollow glass beads, finely divided silicon dioxide, ground plastic waste materials and melamine resins. The process according to the invention is particularly suitable for fillers with a substantial content of particles with particle sizes below 50 $\mu$ and in particular below 10 $\mu$. Thus the process is extremely suitable for dispersing fillers resins with average particle sizes of from 30 to 80$\mu$ in the polyol component of a polyurethane reactive system.

The continuous dispersing method according to the invention is particularly suitable for the continuous production of filler-containing polyurethane plastics by the continuous process, in which the dispersion obtained in the preliminary mixer is fed directly to a mix head for mixing the filler-containing polyol component with the isocyanate component.

The present invention is also directed to an apparatus for continuously dispersing fine particle-sized solids in a liquid by the continuous process, in which the fine particle-sized solids are deaerated before being dispersed in the liquid. The apparatus broadly comprises a mixing apparatus, devices for feeding a constant stream of liquid to the mixing apparatus, an intermediate tank for the fine particle-sized solids, devices for maintaining reduced pressure in the intermediate tank, a screw for conveying the fine-particle-sized solids from the intermediate tank to the mixing apparatus, devices for measuring the pressure in the mixing apparatus, devices for controlling the conveying power of the screw as a function of the pressure in the mixing apparatus, devices for feeding fine particle-sized solids into the intermediate tank, as well as devices for controlling the introduction of the solids into the intermediate tank in accordance with a specific required filler level in the intermediate tank.

Reference will now be made to the drawing. A constant stream of liquid, e.g. the polyol component of a polyurethane reactive system, is fed into the mixing apparatus 1 by means of metering pump 2 via line 3. At the same time, a deaerated fine particle-sized filler is fed into the mixing apparatus 1 via screw 4. The metering of the filler is effected by keeping constant the pressure measured in the mixing apparatus 1 by the pressure-measuring device P, by controlling the driving power of the motor M of the screw 4 via control device 5. The screw 4 conveys the solids issuing from the intermediate tank 6. The intermediate tank 6 is fed with solids from the storage vessel 11 by means of screw 10, the driving power of the motor M of the screw 10 being controlled in a such a manner by the control device 9, as a function of the signal from the filler level probe 7, that the filler level in the intermediate tank 6 is kept approximately constant. The gas space above the filler level of the intermediate tank 6 is continuously deaerated by means of vacuum pump 8. In addition, the contents 12 of the intermediate tank 6 can be loosened by means of loosening devices 13. By means of pump 14 the polyol/solids dispersion is fed directly to a mixhead—which is not illustrated—in which it is mixed with the isocyanate component.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for continuously dispersing fine particle-sized solids in a liquid using a mixing apparatus comprising feeding a constant stream of liquid into the mixing apparatus, feeding the fine particle-sized solids into the mixing apparatus via a screw in which said fine particle-sized solids are compacted, controlling the metering of the solids by controlling the conveying speed of the screw as a function of the pressure prevailing in the mixing apparatus and deaerating the solids in an intermediate vacuum tank before they are introduced into the mixing apparatus, wherein said intermediate vacuum tank is arranged upstream of the screw which supplies the solids to the mixing apparatus, and wherein the filler level of the fine particle-sized solids in the intermediate tank is kept essentially constant.

2. A method of claim 1, wherein the filler level of the fine particle-sized solids in the intermediate tank is at least twice to three times the diameter of the screw.

3. An apparatus for continuously dispersing fine particle-sized solids in a liquid by a continuous process, in which the fine particle-sized solids are deaerated before being dispersed in the liquid, said apparatus comprising a mixing apparatus, a device for feeding a constant stream of liquid into the mixing apparatus, an intermediate tank for the fine particle-sized solids, a device for maintaining a reduced pressure in the intermediate tank, a screw for conveying the fine particle-sized solids from the intermediate tank to the mixing apparatus, a device for measuring the pressure in the mixing apparatus, a device for controlling the conveying power of the screw as a function of the pressure measured by said pressure measuring device and wherein said controlling device is connected to the conveying power for the screw, a device for conveying the fine particle-sized solids to the intermediate tank, and a device for controlling the introduction of the solids into the intermediate tank in accordance with a specific required solids level of the intermediate tank.

4. The apparatus of claim 3, wherein the device for conveying the fine particle-sized solids to the intermediate tank is screw conveyor.

\* \* \* \* \*